US012670162B2

(12) United States Patent
Lin

(10) Patent No.: US 12,670,162 B2
(45) Date of Patent: Jun. 30, 2026

(54) UNIFIED STATISTICS COLLECTION FRAMEWORK USING A PROCESS-BASED TOP-DOWN APPROACH FOR POSTGRES-BASED DATABASE SYSTEMS

(71) Applicant: Google LLC, Mountain View, CA (US)

(72) Inventor: Suzhen Lin, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/461,720

(22) Filed: Sep. 6, 2023

(65) Prior Publication Data

US 2025/0077524 A1 Mar. 6, 2025

(51) Int. Cl.
*G06F 16/24* (2019.01)
*G06F 16/2455* (2019.01)

(52) U.S. Cl.
CPC ................................. *G06F 16/2455* (2019.01)

(58) Field of Classification Search
CPC .................................................. G06F 16/2455
See application file for complete search history.

(56) References Cited

U.S. PATENT DOCUMENTS

| | | | | |
|---|---|---|---|---|
| 8,447,754 B2 * | 5/2013 | Weissman | ........... | G06F 16/2455 |
| | | | | 707/715 |
| 10,970,295 B2 * | 4/2021 | Burger | ................ | G06F 16/2465 |
| 11,068,506 B2 | 7/2021 | Lee et al. | | |
| 2004/0236762 A1 * | 11/2004 | Chaudhuri | ........ | G06F 16/24542 |
| 2005/0160093 A1 | 7/2005 | Abdo et al. | | |

| | | | | |
|---|---|---|---|---|
| 2006/0031189 A1 * | 2/2006 | Muras | ............... | G06F 16/24524 |
| 2006/0195416 A1 * | 8/2006 | Ewen | ................ | G06F 16/24542 |
| 2007/0271217 A1 * | 11/2007 | Lim | .................... | G06F 16/2462 |
| 2007/0271218 A1 * | 11/2007 | Lim | ...................... | G06F 16/217 |
| 2008/0133458 A1 * | 6/2008 | Zabback | .......... | G06F 16/24545 |
| | | | | 715/764 |
| 2009/0083215 A1 * | 3/2009 | Burger | ................ | G06F 16/2462 |
| 2009/0112795 A1 | 4/2009 | Abraham et al. | | |
| 2010/0161930 A1 * | 6/2010 | Lim | ........................ | G06F 16/81 |
| | | | | 711/170 |

(Continued)

OTHER PUBLICATIONS

International Search Report and Written Opinion issued in related PCT Application No. PCT/US2024/044559, dated Nov. 19, 2024.

(Continued)

*Primary Examiner* — Mohammad S Rostami
(74) *Attorney, Agent, or Firm* — Shumaker & Sieffert, P.A.

(57) ABSTRACT

A method for a statistics collection framework includes receiving a schema defining a relational database for storing a plurality of statistics corresponding to a query, the relational database including a plurality of data tables relationally connected according to the schema, each data table of the plurality of data tables corresponding to a respective statistic. The method includes receiving a query corresponding to data at a data store. The method also includes executing the query. During execution of the query, the method includes collecting, from a query execution database, the plurality of statistics related to the query, each statistic of the plurality of statistics corresponding to a respective data table of the plurality of data tables of the relational database and, for each statistic of the plurality of statistics, storing the respective statistic at the respective data table according to the schema.

20 Claims, 8 Drawing Sheets

(56)         References Cited

U.S. PATENT DOCUMENTS

| | | | | |
|---|---|---|---|---|
| 2013/0080416 A1* | 3/2013 | Meade | ................ | G06F 16/2453 |
| | | | | 707/769 |
| 2014/0337562 A1 | 11/2014 | Long et al. | | |
| 2015/0242476 A1* | 8/2015 | Bender | ................ | G06F 16/254 |
| | | | | 707/602 |
| 2015/0310129 A1* | 10/2015 | Ushijima | ........... | G06F 16/9024 |
| | | | | 707/798 |
| 2016/0371332 A1* | 12/2016 | Li | ..................... | G06F 16/24554 |
| 2017/0068710 A1* | 3/2017 | Burger | ............. | G06F 16/24542 |
| 2017/0329835 A1 | 11/2017 | Lee et al. | | |
| 2019/0026279 A1 | 1/2019 | Roitman | | |
| 2020/0356462 A1* | 11/2020 | Anand | ................ | G06F 11/3495 |
| 2021/0303575 A1* | 9/2021 | Butterstein | ....... | G06F 16/24545 |
| 2021/0319131 A1* | 10/2021 | Salomon | ........... | G06F 16/24528 |
| 2022/0004555 A1* | 1/2022 | Kumar | ................ | G06F 11/3452 |
| 2022/0012240 A1 | 1/2022 | Zait et al. | | |
| 2022/0050843 A1* | 2/2022 | Hu | ........................ | G06F 18/217 |
| 2022/0277097 A1* | 9/2022 | Cabot | ................... | H04W 12/02 |
| 2022/0335047 A1* | 10/2022 | Samanta | ............. | G06F 11/3409 |
| 2024/0143595 A1* | 5/2024 | Bove | ..................... | G06F 16/248 |
| 2025/0165473 A1 | 5/2025 | Lin et al. | | |

OTHER PUBLICATIONS

Bruno Nicolas: "Stastistics on query expressions in relational database management systems", Dec. 31, 2003 (Dec. 31, 2003), pp. 1-217, XP093221596.

\* cited by examiner 300,
300A

310 — Instance

Session       Auxiliary Process

Transaction

Query

Activity       Plan       Misc.

300,
300B

310 — Instance

Session

Auxiliary Process

Transaction

Query

Activity

Plan

Misc.

UNIFIED STATISTICS COLLECTION FRAMEWORK USING A PROCESS-BASED TOP-DOWN APPROACH FOR POSTGRES-BASED DATABASE SYSTEMS

TECHNICAL FIELD

This disclosure relates to a unified statistics collection framework using a process-based top-down approach for Postgres-based database systems.

BACKGROUND

As applications today generate significant amounts of data, systems, such as online analytical processing (OLAP) and online transactional processing (OLTP) systems, continue to evolve to support data analysis. Moreover, if a user is unable to perform analysis over his or her data in a manner that is efficient and/or cost-effective, the value of generating a vast amount of data may significantly diminish. To ensure that a user is able to make the best use of data, a user will want to ensure that the processing system is operating quickly and efficiently. For example, in a query processing system, a user can use query statistics related to the execution of a query to better understand the utilization of the database resources and the performance of the query processing system.

SUMMARY

One aspect of the disclosure provides a computer-implemented method for a statistics collection framework. The computer-implemented method is executed by data processing hardware that causes the data processing hardware to perform operations including obtaining a schema defining a relational database for storing a plurality of statistics corresponding to a query, the relational database comprising a plurality of data tables relationally connected according to the schema, each data table of the plurality of data tables corresponding to a respective statistic. The operations include receiving a query corresponding to data at a data store and executing the query. During execution of the query, the operations include collecting, from a query execution database, the plurality of statistics related to the query, each statistic of the plurality of statistics corresponding to a respective data table of the plurality of data tables of the relational database and, for each statistic of the plurality of statistics, storing the respective statistic at the respective data table according to the schema.

Implementations of the disclosure may include one or more of the following optional features. In some implementations, the schema includes a tree data structure comprising a plurality of nodes. In these implementations, each data table of the plurality of data tables corresponds to a respective node of the plurality of nodes of the tree data structure. Further, in these implementations, the operations may further include receiving an indication to cease collecting a particular statistic of the plurality of statistics and, in response to receiving the indication to cease collecting the particular statistic of the plurality of statistics, ceasing collection of the particular statistic. In these implementations, the operations may further include, in response to receiving the indication to cease collecting the particular statistic of the plurality of statistics, identifying a particular node of the tree data structure of the schema that corresponds to the particular statistic and, for each node of the plurality of nodes that is a descendant from the particular node, ceasing collection of the respective statistics of the respective data table that corresponds to the respective node.

Collecting the plurality of statistics related to the query may repeat at periodic intervals. In some implementations, the operations further include determining a size of the plurality of statistics and determining that the size of the plurality of statistics satisfies a predefined size threshold. In these implementations, the operations further include, in response to determining that the size of the plurality of statistics satisfies a predefined size threshold, ceasing collection of the plurality of statistics related to the query.

In some implementations, the operations further include determining a duration of the query and determining that the duration of the query satisfies a predefined duration threshold. In these implementations, the operations further include, in response to determining that the duration of the query satisfies a predefined duration threshold, ceasing collection of the plurality of statistics related to the query. The plurality of statistics may include one or more of instance statistics, session statistics, auxiliary process statistics, transaction statistics, activity statistics, wait event statistics, query statistics, or plan statistics.

In some implementations, the operations further include normalizing the plurality of statistics to remove identifying information. In these implementations, the operations may further include aggregating a plurality of normalized statistics corresponding to a plurality of queries to generate a plurality of generalized statistics corresponding to the plurality of queries.

Another aspect of the disclosure provides a system for a statistics collection framework. The system includes data processing hardware and memory hardware in communication with the data processing hardware. The memory hardware stores instructions that when executed on the data processing hardware cause the data processing hardware to perform operations. The operations include obtaining a schema defining a relational database for storing a plurality of statistics corresponding to a query, the relational database comprising a plurality of data tables relationally connected according to the schema, each data table of the plurality of data tables corresponding to a respective statistic. The operations include receiving a query corresponding to data at a data store and executing the query. During execution of the query, the operations include collecting, from a query execution database, the plurality of statistics related to the query, each statistic of the plurality of statistics corresponding to a respective data table of the plurality of data tables of the relational database and, for each statistic of the plurality of statistics, storing the respective statistic at the respective data table according to the schema.

This aspect may include one or more of the following optional features. In some implementations, the schema includes a tree data structure comprising a plurality of nodes. In these implementations, each data table of the plurality of data tables corresponds to a respective node of the plurality of nodes of the tree data structure. Further, in these implementations, the operations may further include receiving an indication to cease collecting a particular statistic of the plurality of statistics and, in response to receiving the indication to cease collecting the particular statistic of the plurality of statistics, ceasing collection of the particular statistic. In these implementations, the operations may further include, in response to receiving the indication to cease collecting the particular statistic of the plurality of statistics, identifying a particular node of the tree data structure of the schema that corresponds to the particular statistic and, for each node of the plurality of nodes that is a descendant from the particular node, ceasing collection of the respective statistics of the respective data table that corresponds to the respective node.

Collecting the plurality of statistics related to the query may repeat at periodic intervals. In some implementations, the operations further include determining a size of the plurality of statistics and determining that the size of the plurality of statistics satisfies a predefined size threshold. In these implementations, the operations further include, in response to determining that the size of the plurality of statistics satisfies a predefined size threshold, ceasing collection of the plurality of statistics related to the query.

In some implementations, the operations further include determining a duration of the query and determining that the duration of the query satisfies a predefined duration threshold. In these implementations, the operations further include, in response to determining that the duration of the query satisfies a predefined duration threshold, ceasing collection of the plurality of statistics related to the query. The plurality of statistics may include one or more of instance statistics, session statistics, auxiliary process statistics, transaction statistics, activity statistics, wait event statistics, query statistics, or plan statistics.

In some implementations, the operations further include normalizing the plurality of statistics to remove identifying information. In these implementations, the operations may further include aggregating a plurality of normalized statistics corresponding to a plurality of queries to generate a plurality of generalized statistics corresponding to the plurality of queries.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
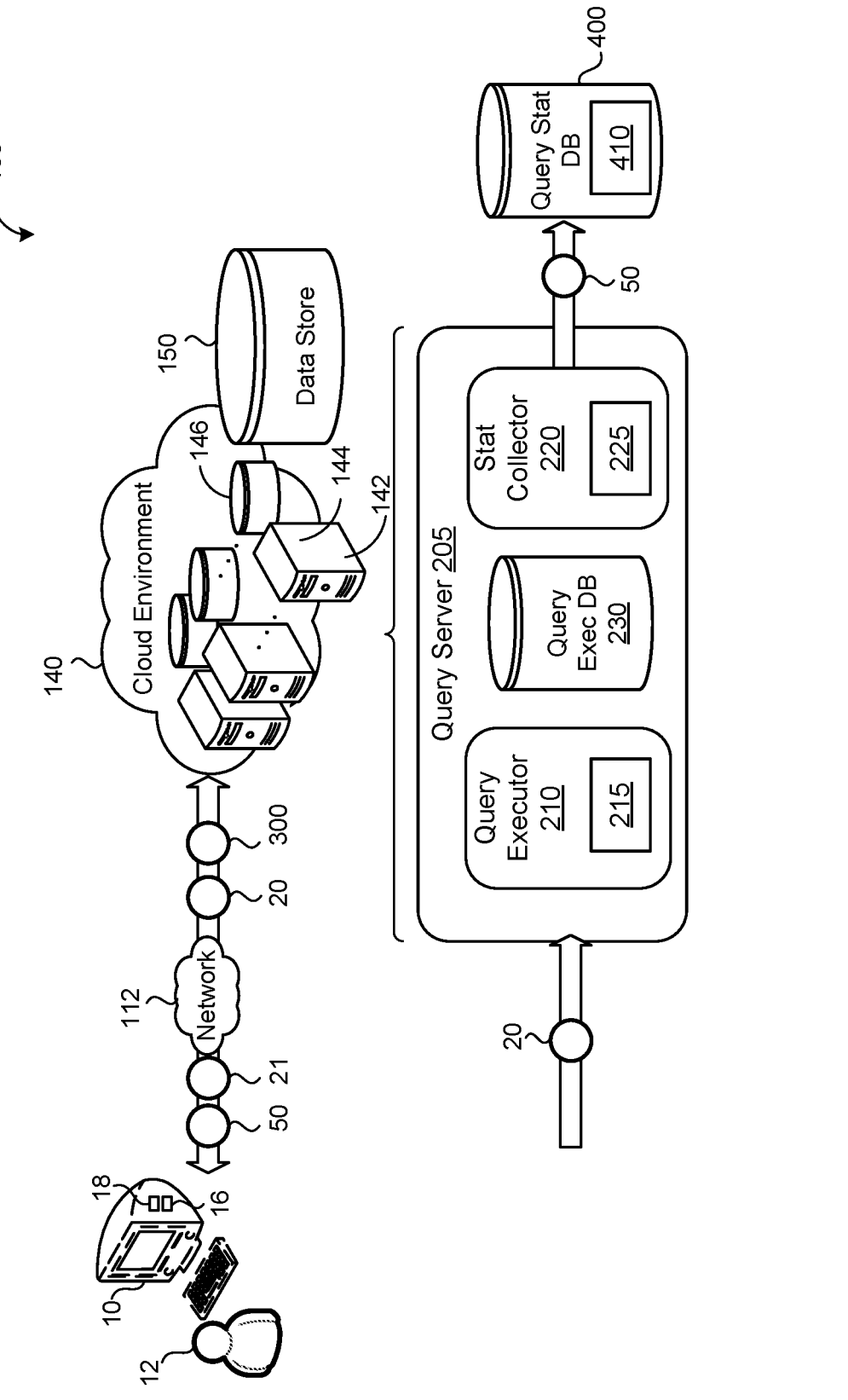
FIG. 1 is a schematic view of an example system for a statistics collection framework.

Many query systems include a process-based architecture where different processes handle various tasks to ensure efficient and concurrent database operations during execution of the query. In some examples, these query systems are based around PostgreSQL (also referred to herein as Postgres), a powerful, open source object-relational database system that uses and extends the SQL language combined with many features that safely store and scale the most complicated data workloads (e.g., queries). For customers utilizing query systems, it can be helpful to understand their queries' utilization of database resources and performance of workloads. These customers may also benefit from the ability to effectively troubleshoot any performance issues, including identifying reasons behind slow query execution, determining the phase in which a query is stuck, and understanding how system resources are utilized by queries.

Currently, there are a number of open-source tools for collecting statistics during the execution of a query in a query system. However, these tools fall short of providing a comprehensive view of the system workload and often lack historical statistics. Regarding PostgreSQL specifically, Postgres offers a cumulative statistics system that enables the collection and reporting of information about server activity. Further, Postgres supports reporting dynamic information regarding system events. However, in Postgres, data is obtained through views and is not persisted to disk or tables. Consequently, the available tools in Postgres do not offer the level of granularity necessary for enterprise-grade observability, and historical information cannot be accessed due to the lack of persistence. Overall, while there are existing tools in the open-source domain for statistics collection in a query system, none of these tools satisfy the requirements for enterprise-grade observability, which necessitates a more comprehensive and correlated solution.

Implementations herein are directed to efficient comprehensive statistics collection and storage in a query (or transactional) system, such as an online analytical processing (OLAP) system and/or an online transactional processing (OLTP) system. In other words, the current disclosure provides for prompt delivery of workload observability, including comprehensive and detailed query statistics for both real-time and historical workloads. The collected statistics may encompass various levels of information related to a query, such as session statistics, transaction statistics, query statistics, plan statistics, wait events statistics, buffer usage statistics, write-ahead logging (WAL) usage statistics, etc. In some implementations, the statistics collection framework is designed according to the process architecture of PostgreSQL or PostgreSQL-based database systems. For example, a schema defining how to store the various statistics can be based on the Postgres architecture.

In some implementations, the current disclosure includes receiving a schema defining organization of a relational database, where the schema indicates how each table is interconnected with each other table of the relational database. Here, each table of the relational database may correspond to a particular statistic related to a query. In response to receiving a query, a query server may execute the query while simultaneously collecting query statistics during execution of the query. The query server may propagate the query statistics to a relational database according to the schema.

Referring to FIG. 1, in some implementations, a statistics collection framework system 100 includes a cloud environment 140 (e.g., a high-performance remote server or cluster of high-performance remote servers) in communication with one or more user devices 10 via a network 112. The client device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The cloud environment 140 may be a single computer, multiple computers, or a distributed system having scalable/ elastic resources 142 including computing resources 144 (e.g., data processing hardware) and/or storage resources 146 (e.g., memory hardware). The cloud environment 140 may be configured to execute a query server 205 for executing queries 20. A data store 150 (i.e., a remote storage device) may be overlain on the storage resources 146 to allow scalable use of the storage resources 146 by one or more of the clients (e.g., the user device 10) or the computing resources 144 (e.g., the query server 205). The data store 150 is configured to store data for queries 20.

Figure 3A:
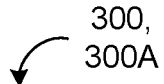
FIG. 3A is a schematic view of an example schema for a statistics collection framework.
Figure 3B:
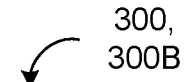
FIG. 3B is a schematic view of an example schema for a statistics collection framework with deactivated nodes.

The cloud environment 140 is configured to obtain a schema 300 from, for example, a client device 10 associated with a respective user 12 via the network 112. In some implementations, the schema 300 may be stored at one or more databases of the statistics collection framework system 100 (e.g., the storage resources 16, the data store 150, storage resources 146) or some database communicatively coupled to the system 100. Further, the cloud environment 140 may have access to multiple schemas 300 stored at the various data stores of the system 100. The schema 300 may define a logical structure within a database for storing data. In some implementations, the schema 300 defines a query statistics database 400 including a plurality of data tables 410 for storing a plurality of statistics 50 corresponding to a query 20 or queries 20. The schema 300 may include a tree data structure including a plurality of interconnected nodes, where each node represents a respective data table 410 of the query statistics database 400. The schema is discussed in greater detail below (FIGS. 3A and 3B). For example, the query statistics database 400 is a relational database and the schema 300 defines how each data table 410 of the relational database is relationally connected. Further, each data table 410 may correspond to a specific statistic 50 (i.e., a statistical category) such as "session," "transaction," etc. Here, the data table 410 may store any relevant data corresponding to the specific statistic 50 (e.g., the "session" data table 410 may include a session identification, a session start time, a session end time).

The cloud environment 140 executes a query server 205 (including a query executor 210, a query execution database 230, and a statistics collector 220) for executing the query 20 against the data store 150. In some implementations, the query server 205 is a process based query system (i.e., a Postgres based system). In these implementations, the query server 205 executes the query by one or more processes 215 of the query executor. Here, the query executor 210 may store data related to the query 20 at the query execution database 230 before, during, and/or after execution of the query 20.

The statistics collector 220 may obtain statistics 50 related to the query 20 from the query execution database 230. In some implementations, the statistics collector 220 includes a plurality of modules 225, each module 225 of the plurality of modules 225 configured to collect data for a corresponding respective statistics 50 of the plurality of statistics 50. In these implementations, certain modules 225 can be disabled to stop collection of the respective corresponding statistics 50. For example, if the statistics collector 220 is expending too many resources and slowing down the execution of queries 20 by the query module 225, then the statistics collector 220 disables some or all modules 225. The query server 205 may then transmit/write the statistics 50 to a query statistics database 400. When writing the statistics to the query statistics database 400, the query server 205 may write each statistic 50 of the plurality of statistics 50 to a corresponding respective data table 410 of the query statistics database 400. In some configurations, the query statistics database 400 is persistent and/or non-volatile such that data, by default, is not overwritten or erased by new incoming data. Further, the query execution database 230 and the query statistics database 400 may co-located in the same system (i.e., cloud environment 140).

In some examples, the data store 150 is a data warehouse (e.g., a plurality of databases) as a means of data storage for the user 12 (or multiple users). Generally speaking, the data store 150 stores data from one or more sources and may be designed to analyze, report, and/or integrate data from its sources. The data store 150 enables users (e.g., organizational users) to have a central storage depository and storage data access point. The data store 150 may simplify data retrieval for functions such as data analysis and/or data reporting (e.g., by the query server 205 for executing queries 20). Furthermore, the data store 150 may be configured to store a significant amount of data such that a user 12 (e.g., an organizational user) can store large amounts of historical data to understand data trends. Being that the data store 150 may be the main or sole data storage depository of data, the data store 150 may often be receiving large amounts of data (e.g., gigabytes per second, terabytes per second, or more) from user devices 10 associated with the user 12.

The query server 205 is configured to request information or data from the data store 150 when executing the query 20. In some examples, the query 20 is initiated by the user 12 (via client device 10) as a request for data within the data store 150 (e.g., an export data request). For instance, the user 12 interacts with the query server 205 (e.g., an interface associated with the query server 205) to retrieve data being stored in the data store 150 of the cloud environment 140. Here, the query 20 may be user-originated (i.e., directly requested by the user 12) or system-originated (i.e., configured by the query server 205 itself). In some examples, the query server 205 configures routine or repeating queries 20 (e.g., at some designated frequency) to allow the user 12 to perform analytics or to monitor data stored in the data store 150.

The format of the query 20 may vary, but generally includes reference to specific data stored in the data store 150. In response to the query 20, the query server 205 generates a query response 21 fulfilling or attempting to fulfill the request of the query 20 (e.g., a request for particular data). Generally speaking, the query response 21 includes data that the query server 205 obtains in response to the query 20. The query server 205 may return this query response 21 to an entity that originates the query 20 (e.g., the user 12) or another entity or system communicating with the system 100. Further, the query server 205 is also configured to collect statistics 50 related to the query 20. The user 12 may then obtain the statistics 50 for one or more queries 20. In some implementations, the user 12 may obtain normalized/aggregated statistics 51 (FIG. 5) and/or snapshots 52 (FIG. 5) providing statistics 50 for all queries executed by the query server 205, providing insight into the overall performance of the query server 205.

The system 100 of FIG. 1 is presented for illustrative purposes only and is not intended to be limiting. For example, although only a single example of each component is illustrated, the system 100 includes any number of components 10, 140, 150, and 205. Further, although some components are described as being located in a cloud computing environment 140, in some implementations, some or all of the components may be hosted locally on the client device 10. Further, in various implementations, some or all of the components 150 and 205, are hosted locally on client device 10, remotely (such as in the cloud computing environment 140), or some combination thereof.

Figure 2:
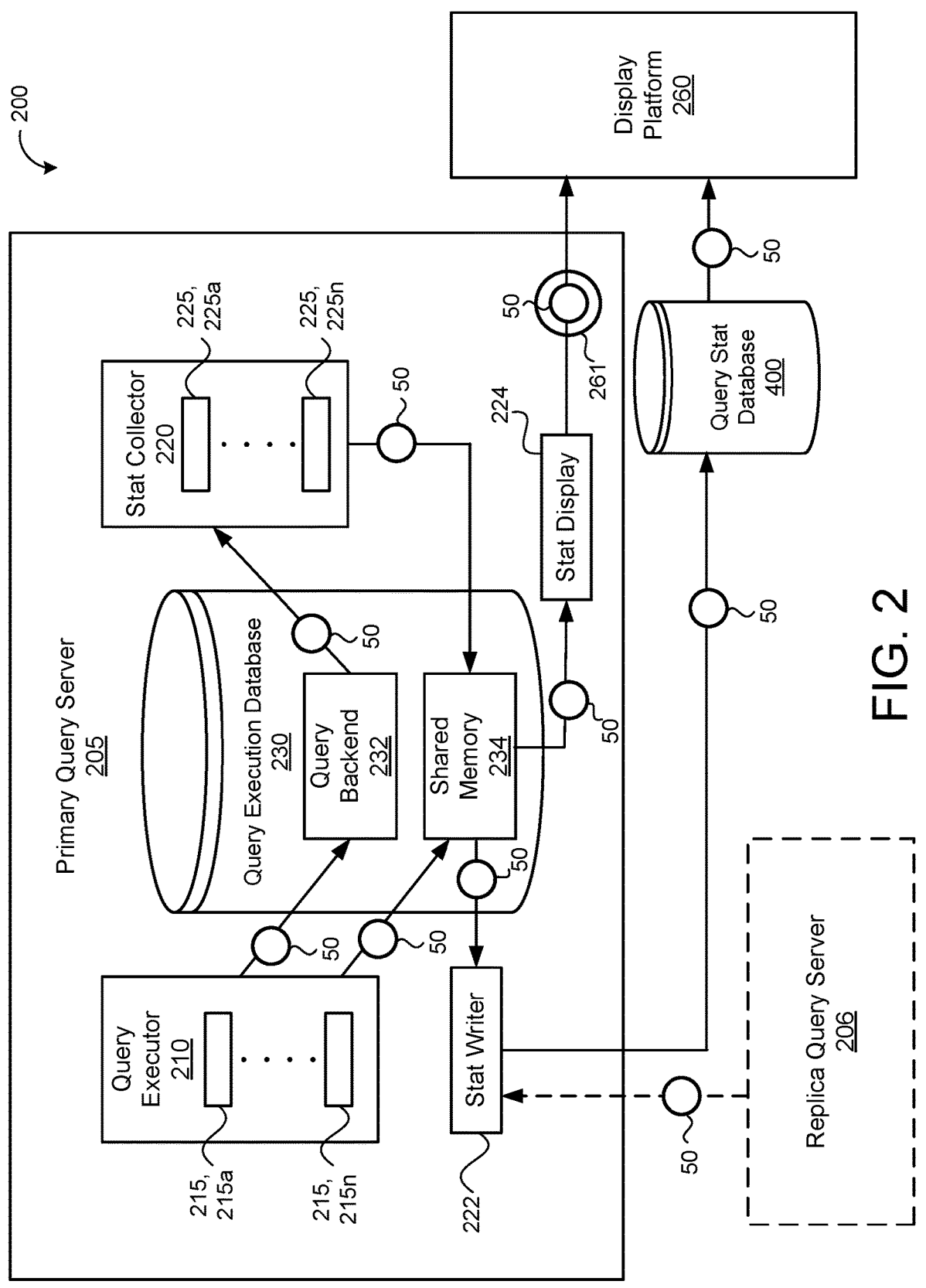
FIG. 2 is a schematic view of an example statistics collection framework in a process-based database system.

FIG. 2 schematically illustrates an example statistics collection framework 200. In some examples, the framework 200 is organized according to a process-based database query system, such as Postgres. PostgreSQL itself follows a process-based architecture where different processes handle various tasks to ensure efficient and concurrent database operations (e.g., query execution). The postmaster process, also known as the "master server process," is the parent process that manages the PostgreSQL system. The postmaster process starts and stops processes and manages client connections. For example, when a client connects to the PostgreSQL server, a client-connected backend process is spawned to handle that client's request. Each client-connected backend process is responsible for managing transactions, executing queries, and interacting with the client. Other processes, called auxiliary processes, handle tasks in the background. Example auxiliary processes include background Writer, Checkpointer, Autovacuum Launcher and Worker Process, etc. In Postgres, all of the backend processes have access to a shared memory pre-allocated during database startup.

Referring back to FIG. 1 with reference to FIG. 2, the framework includes the query server 205 that serves as a primary or master server that can perform both read and write operations. The query server 205 includes the query executor 210 that includes processes 215, a query execution database 230 having allocated memory for query backend 232 and shared memory 234, a statistics collector 220 including modules 225, a statistics writer 222, and a statistics display 224. Though FIG. 2 only includes the query execution database 230, the query server 205 may execute queries 20 for any number of databases of the cloud environment 140. Like in Postgres, the query server 205 initiates the processes 215, via the query executor 210, to execute the query 20. However, the processes 215 of the query server 205 may also be configured to collect statistics 50 while executing the query 20. As each process 215 is responsible for a specific task, statistics 50 collection begins at the process 215 level, enabling the collection of comprehensive statistics 50.

In some implementations, statistics 50 collection operates by implementing hooks within the database kernel codes for various events shown in the schema 300 hierarchy, including instance start/exit, process start/exit, transaction start/end, query 20 start/end, wait event start/end. The processes 215 use these hooks to generate statistics 50 for the events and store the statistics 50 in the dedicated shared memory 234. Further, key events in query 20 execution may be stored in the data structure (i.e., the query backend 232) within the query execution database 230. For live statistics 50, the statistics collector 220 may periodically pull the status from query backend 232 and generate a record to store into the shared memory 234. In some implementations, the primary query server 205 implements ring buffers to efficiently store the statistics 50 in shared memory 234 (and/or query statistics database 400). Further, on the query server 205 a hash table may be defined to facilitate finding the event/activity start record in memory (i.e., shared memory 234 and/or query statistics database 400). To minimize lock contention, the ring buffers are partitioned, typically matching the number of virtual CPUs on the query server 205. Further, the ring buffers may also include size limits to prevent over consumption of resources. In some implementations, the shared memory 234 also is organized according to the schema 300.

In some implementations, the stat collector implements modules 225 to obtain and store statistics 50. For example, a module 225 corresponds to a specific process 215 and/or statistic 50. The module 225 may then obtain the particular statistics 50 from the query backend 232 and then store the statistics 50 to the shared memory. A statistics writer 222 will periodically write the statistics 50 from the shared memory 234 to database tables 410 of the query statistics database 400. Correlation among different events in the schema 300 hierarchy is achieved by storing the unique identification of events in query backend 232. The modules 225 of the statistics collector 220 can access query backend 232 to determine correlation among different events/activities.

In some implementations, the query backend 232 includes an array dedicated to store statistics 50 generated by the query executor 210. Each process 215 of the query executor 210 may correspond to a slot in the array such that the process 215 stores all of the corresponding statistics 50 in the corresponding slot of the array. In these implementations, the stat collector 220 periodically sweeps the array of the query backend 232 to obtain all live backend process state (e.g., statistics 50), generates a record for each process 215, and stores the record in the shared memory 234 (e.g., populates the statistics 50 into the shared memory 234).

There are many factors to consider when collecting statistics 50 related to queries 20. In particular, performance impact and resource usage (e.g., CPU, memory, disk) must be considered, as degrading performance or overburdening the system would make statistics 50 collection unviable. To keep the overhead low, the query server 205 may implement various mechanisms during statistics 50 collection to reduce the amount of statistics 50 collected and accordingly minimize performance impact. For example, the query server 205 implements a size threshold, where query server 205 ceases (or limits/slows down) collection of statistics 50 when the collected statistics 50 reach a threshold size in one of the databases 230, 400. In another example, the query server 205 implements a time threshold, where the query server ceases collecting statistics 50 after a threshold period of time. Alternatively, the query server 205 may implement a retention policy (e.g., garbage collection) and deletes statistics 50 and other data older than a time to live (TTL). Further, the query server 205 may implement a duration threshold, where a duration of a query 20 must exceed the duration threshold in order to activate statistics 50 collection. In transactional systems, there may be numerous short queries 20, and collecting statistics 50 for all of these short queries 20 would produce an overwhelming amount of statistics 50. Thus, the duration threshold mitigates the risk of collecting statistics 50 for short queries 20.

Further, the query server 205 may support on-demand statistics collection. For example, each process 215 is connected to a flag. In some implementations, the flags/processes 215, are aligned with the schema 300 hierarchy. Thus, enabling a particular flag causes the corresponding process 215 to collect statistics 50 (and ultimately populate the corresponding data table 410). These flags allow users to enable statistics 50 collection for specific queries 20 experiencing performance issues. Flags can be enabled/disabled dynamically by passing the query's unique ID to a SQL function that modifies the flag value. These implementations reduce the space usage for long-running live queries where statistics 50 get generated and collected periodically by the statistics collector 220.

A statistics display 224 may be configured to generate a user interface 261 including the statistics 50. The statistics display may transmit the user interface 261 to a display platform 260 (e.g., a client device) to display the user interface 261 to a user.

In some implementations, one or more replica query servers 206 are configured to perform read operations only. The replica query servers 206 may be configured like the query server 205 and include all of the elements of the query server 205. On the replica query server 206, the statistics writer 222 may port statistics 50 to the statistics writer 222 of the query server 205 allowing the statistics writer 222 of query server 205 to write the statistics to the query statistics database 400.

FIG. 3A schematically illustrates an example schema 300, 300A. The schema 300A is intended to organize the way statistics 50 are stored (for example, in query statistics database 400 (FIG. 1). In particular, the schema 300A provides for faster and more efficient collection of statistics 50 by organizing the data to reduce redundancy and also by having particular modules (225) collect respective corresponding statistics 50. In this example, the schema 300A is a tree data structure having a plurality of nodes 310. Each node 310 may be connected to at least one other node 310 of the tree data structure, either as a descendant (child), ancestor (parent), or sibling. As will be discussed in greater detail below (FIG. 4), each node 310 may represent a data table 410 of the query statistics database 400, and, in particular, indicates how each data table 410 is relationally connected to each other data table 410. In some implementations, single nodes 310 may correspond to multiple data tables 410 of the query statistics database 400.

In some implementations, a user is able to disable one or more nodes 310 of the schema (also referred to herein as "flagging"). When a user flags a node 310, the query server 205 may cease collecting data for the corresponding node. FIG. 3B schematically illustrates another example schema 300, 300B with a number of disabled nodes 310. In particular, the nodes 310 corresponding to transaction, query, and plan have all been disabled. In some implementations, when a node 310 is disabled, each node 310 that is a descendant of the disabled node 310 is also disabled. For example, in the example of FIG. 3B, a user has disabled the transaction node 310, and thus each node that is downstream from the transaction node 310 is also disabled. In some implementations, the query server 205 disables one or more nodes 310. For example, if the query server 205 determines that statistics 50 collection is impeding or reducing the performance of the execution of a query 20, the query server disables at least one node of the schema 300. In another example, the query server 205 periodically determines a size of the collected statistics 50 and compares the size to a threshold size. When the size satisfies the threshold size, the query server 205 disables one or more nodes 310 of the schema (in turn, disabling collection of statistics 50 for the corresponding data table 410 of the query statistics database 400).

The example schemas 300A, 300B of FIGS. 3A and 3B are not intended to be limiting and any number of nodes 310 can be added, removed, combined, and/or separated into multiple nodes. The schema 300 can be of any suitable form and of any suitable structure (array, linked list, queue). For example, the schema 300 has the nodes 310 organized in any suitable manner and/or hierarchy. Further, the schema 300 may have any number of nodes 310 as appropriate. The nodes 310 may correspond to any pertinent aspect of statistics for queries 20 even if not listed herein.

Figure 4:
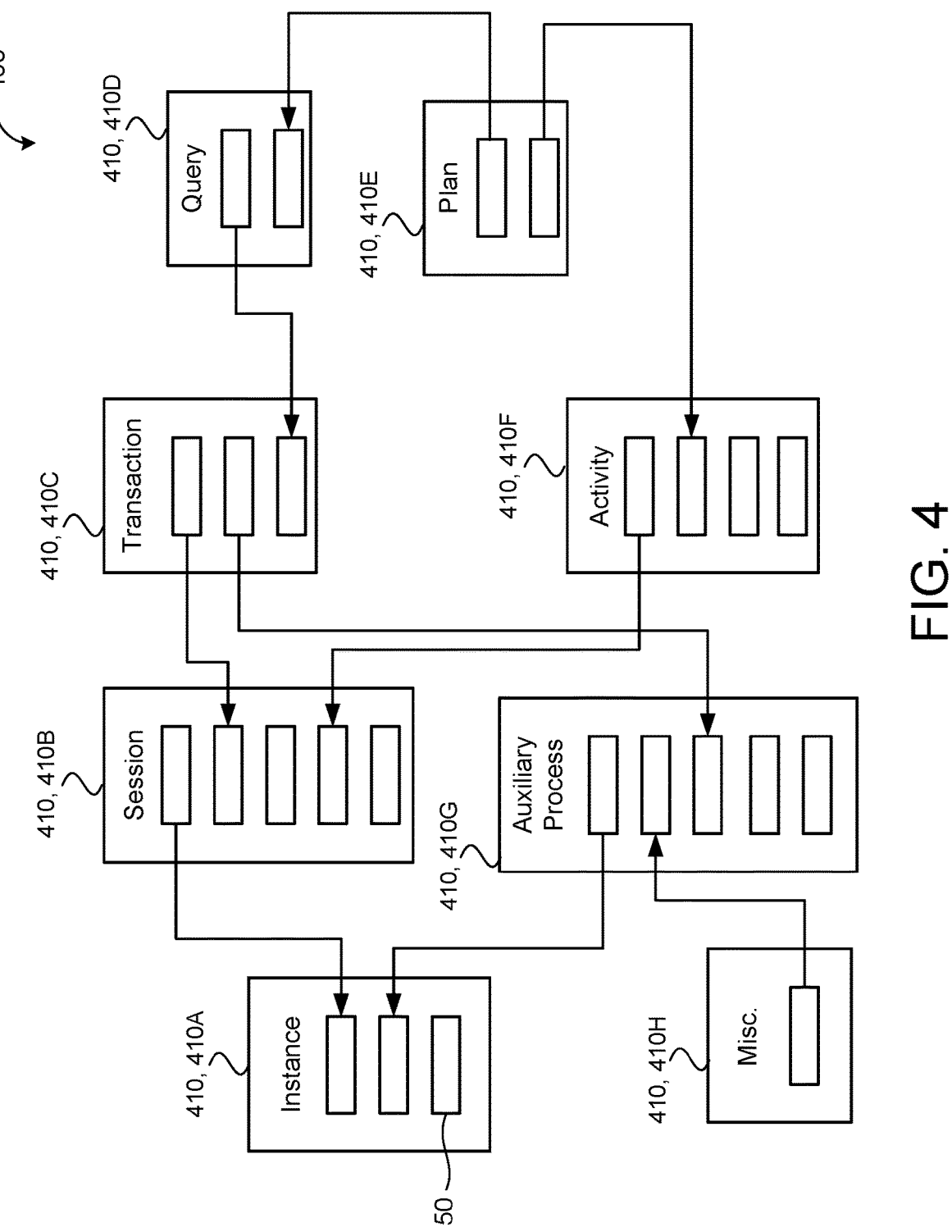
FIG. 4 is a schematic view of an example relational database for a statistics collection framework.

FIG. 4 schematically illustrates an example query statistics database 400 organized as a relational database having a number of interconnected data tables 410, 410A-H. The query statistics database 400 may be organized according to a schema 300, such that each data table 410 corresponds to a node 310 of a tree data structure defining the schema 300. Here, each data table 410 stores one or more statistics 50. In some implementations, each data table 410 corresponds to a category, such as instance 410, 410A, session 410, 410B, transaction 410, 410C, query 410, 410D, plan 410, 410E, activity 410, 410F, auxiliary process 410, 410G, or miscellaneous 410, 410H. In some implementations, instead of storing all of the statistics 50 corresponding to the category of the data table 410, the data table 410 refers to another data table 410 that stores other categorical statistics 50. In other words, instead of storing the instance data at each data table 410, the instance data may be stored at an instance data table 410A, and each other respective data table 410 may refer to instance data table 410A as necessary. This approach eliminates the need for excessive parameter passing and enables seamless access to hierarchical information throughout the system, improving efficiency and simplifying the handling of correlated data within the framework. The example query statistics database 400 is not intended to be limiting and can be of any suitable form and include any number of data tables 410 as necessary.

Figure 5:
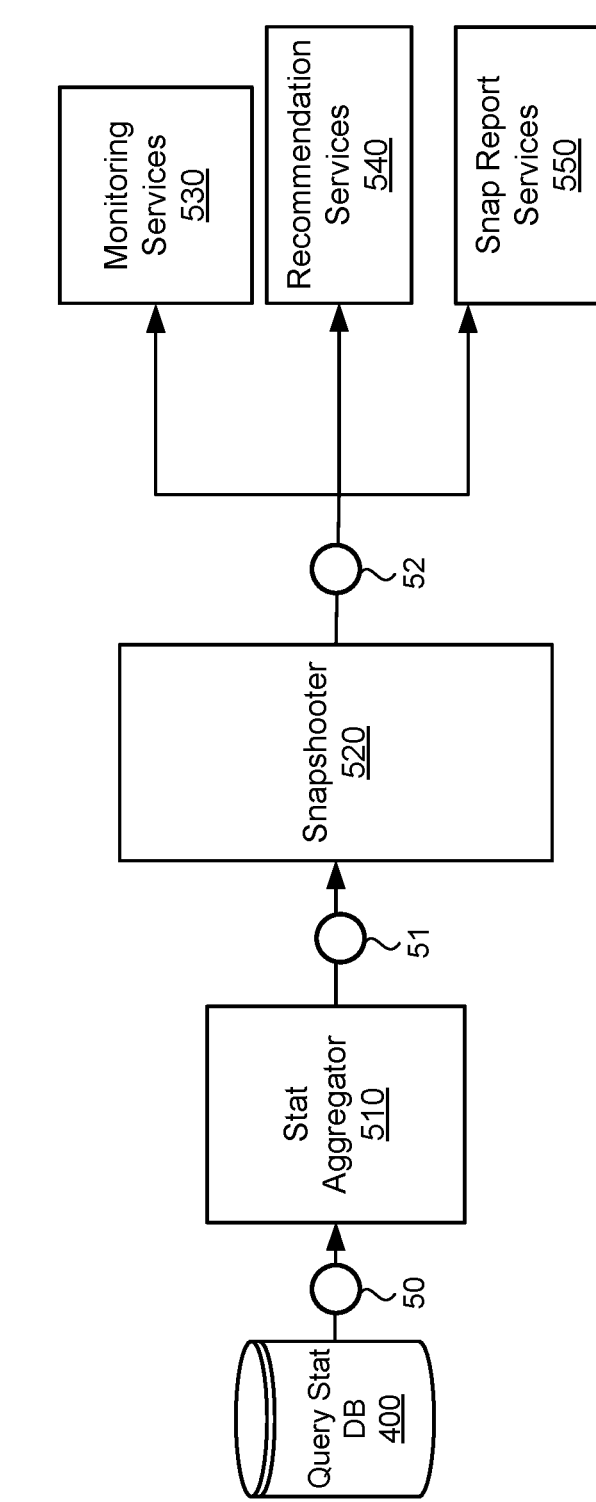
FIG. 5 is a schematic view of example statistics aggregation for a statistics collection framework.

FIG. 5 schematically illustrates a statistics aggregation and snapshot process 500. Statistics 50 aggregation is done by a statistics aggregator 510. The statistics aggregator 510 may obtain statistics 50, such as plan call number, total plan time, execution call number, total execution time, buffer block access information, WAL usage information, wait events for a normalized query by checking a list of aggregation dimensions including database ID, user ID, client address, etc., from query statistics database 400. The statistics aggregator 510 may then aggregate the obtained statistics 50 by removing any identifying information. In some implementations, a list of frequently used aggregation dimensions is identified as the base for aggregated statistics, providing the finest granularity. Further, aggregation can be achieved through SQL queries or in-memory operations of the statistics aggregator 510. In some implementations, the aggregated statistics 51 are accumulated and stored in a hash table within shared memory (e.g., query statistics database 400 of data store 150).

In some implementations, a background worker process called a snapshooter 520 periodically captures snapshots 52 of the aggregated statistics 51 (e.g., of the hash table) and stores and/or propagates the snapshots 52 to a service, such as a monitoring service 530, a recommendation service 540, or a snap report services 550. Each of the services 530, 540, 550 may require snapshots 52 in a particular form to render services. The snapshooter 520 may reset the hash table after each snapshot 52, enabling the monitoring service 530 to generate time-series data for monitoring. The snapshooter 520 may support recommendation services 540 by providing snapshots 52 of aggregated statistics 51 from a past time window (e.g., three days). The snapshooter 520 may generate a report for a specific set of aggregated queries. These mechanisms collectively contribute to efficient statistics collection, enabling comprehensive analysis and monitoring of database performance.

In some implementations, the snapshooter 520 includes the processes 215 of the query executor 210 (FIG. 2). In these implementations, when executing a query 20, the processes 215 calculate the aggregation hash, and store the collected aggregated statistics 51 into the aggregation hash table. The hash table may be partitioned and further aggregation of the partitioned hash table may be executed using SQL or a separate background process (e.g., another aggregator).

Figure 6:
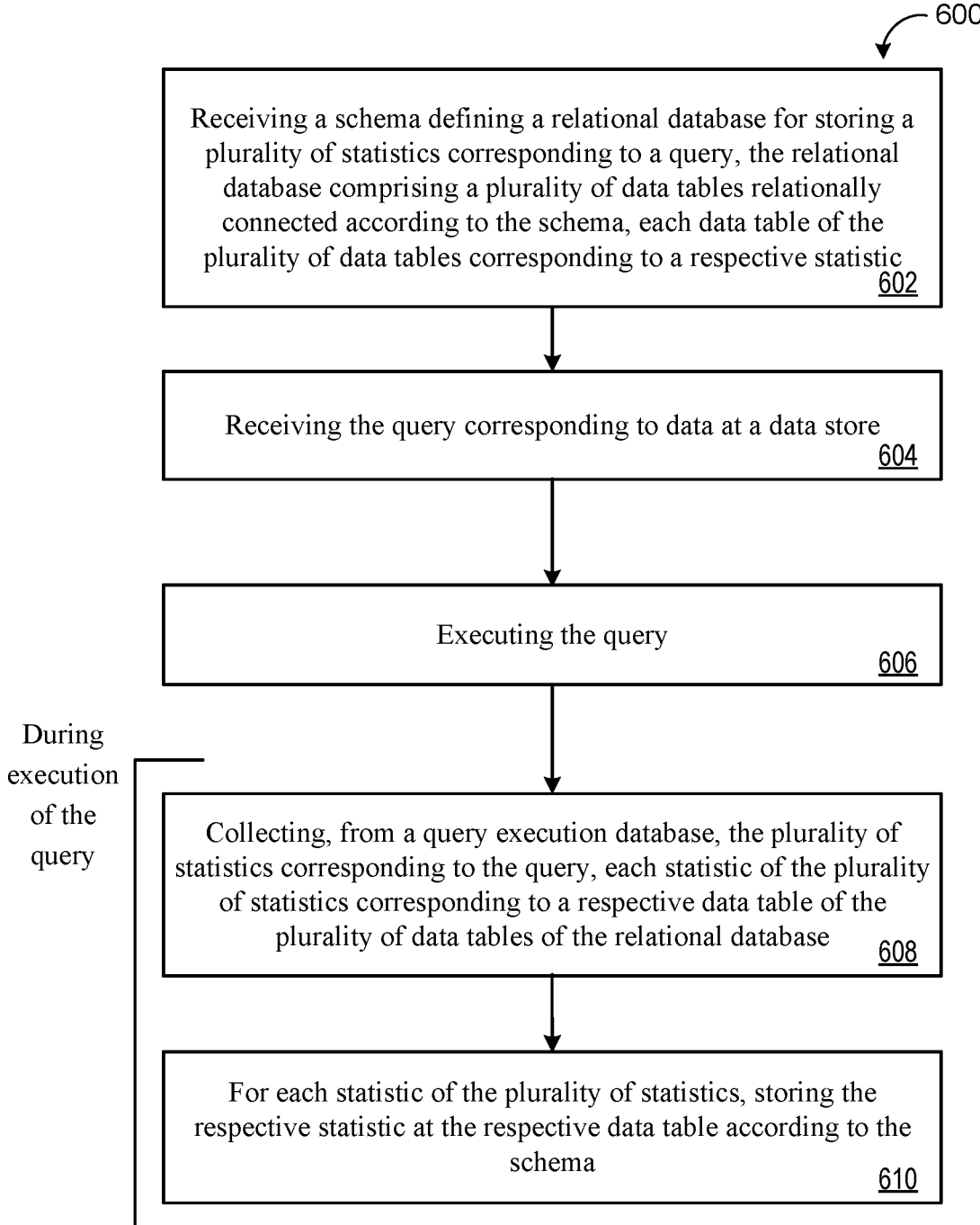
FIG. 6 a flowchart of an example arrangement of operations for a method of a statistics collection framework.

FIG. 6 is a flowchart of an exemplary arrangement of operations for a method 600 of a statistics collection framework. The method 600 can be performed by various interconnected computing devices of a computing system, such as the components of the system 100 of FIG. 1 and/or the computing device 700 of FIG. 7. At operation 602, the method 600 includes obtaining a schema 300 defining a relational database 400 for storing a plurality of statistics 50 corresponding to a query 20, the relational database 400 comprising a plurality of data tables 410 relationally connected according to the schema 300, each data table 410 of the plurality of data tables 410 corresponding to a respective statistic 50. At operation 604, the method 600 includes receiving a query 20 corresponding to data at a data store 150. At operation 606, the method 600 includes executing the query 20. During execution of the query, the method 600 includes operations 608 and 610. At operation 608, the method 600 includes collecting, from a query execution database 230, the plurality of statistics 50 related to the query 20, each statistic 50 of the plurality of statistics 50 corresponding to a respective data table 410 of the plurality of data tables 410 of the relational database 400. At operation 610, the method 600 includes, for each statistic 50 of the plurality of statistics 50, storing the respective statistic 50 at the respective data table 410 according to the schema 300.

Figure 7:
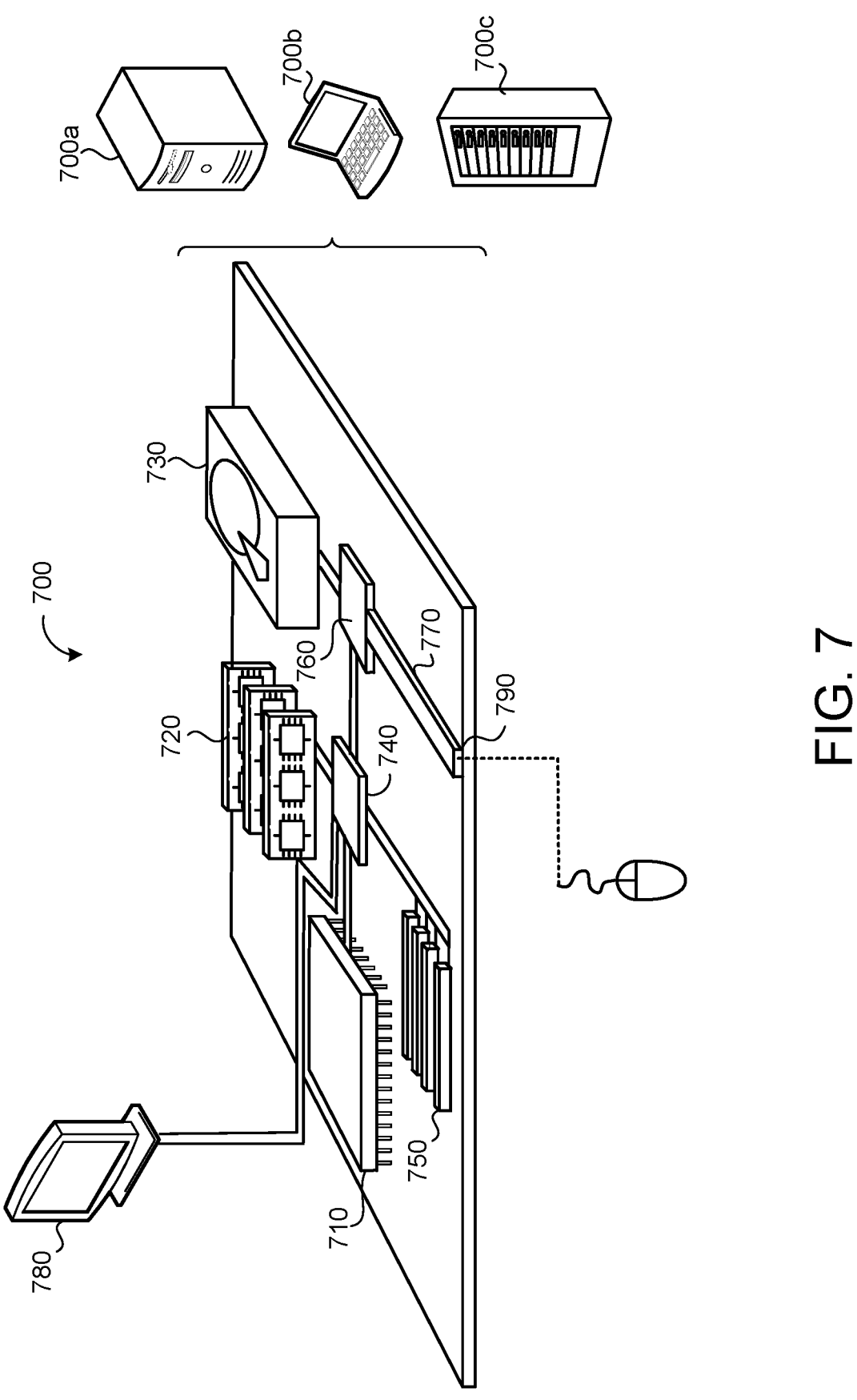
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:

receiving, by data processing hardware, a schema defining a relational database for storing a plurality of statistics corresponding to a query, the relational database comprising a plurality of data tables relationally connected according to the schema, each data table of the plurality of data tables corresponding to a respective statistic, wherein the plurality of statistics includes a first statistic having a first statistic type and a second statistic having a second statistic type that is distinct from the first statistic type, wherein the first and second statistic types are selected from the group consisting of: instance statistics, session statistics, transaction statistics, query statistics, plan statistics, and wait event statistics;

obtaining the query corresponding to data at a data store;

executing, using a query executor, the query on the data at the data store; and during execution of the query on the data at the data store:

collecting, by the data processing hardware and as the query is executing, from a query execution database, the plurality of statistics indicative of performance characteristics specific to the query that is currently executing, each statistic of the plurality of statistics corresponding to a respective data table of the plurality of data tables of the relational database;

for each statistic of the plurality of statistics, storing, by the data processing hardware, the statistic at the respective data table according to the schema;

receiving an indication to cease collecting the first statistic type; and responsive to receiving the indication, ceasing collection of the first statistic associated with the first statistic type while continuing to collect at least the second statistic associated with the second statistic type.

2. The method of claim 1, wherein:

the schema comprises a tree data structure comprising a plurality of nodes;

each data table of the plurality of data tables corresponds to a respective node of the plurality of nodes of the tree data structure; and the plurality of statistics includes one or more of: session statistics, transaction statistics, query statistics, plan statistics, wait event statistics, buffer usage statistics, or write-ahead logging (WAL) usage statistics.

3. The method of claim 1, wherein, in response to receiving an indication to cease collecting the first statistic type, the method further comprises:

identifying a particular node of a tree data structure of the schema that corresponds to the first statistic; and ceasing collection of statistics associated with each node in the tree data structure that is descendant from the particular node.

4. The method of claim 1, further comprising:

accessing the stored plurality of statistics, by the data processing hardware, from the respective data table according to the schema; and executing a second query on the data store, the second query being based at least in part on the accessed plurality of statistics.

5. The method of claim 1, wherein the plurality of statistics include one or more of:
  instance statistics;
  session statistics;
  auxiliary process statistics;
  transaction statistics;
  activity statistics;
  wait event statistics;
  query statistics; or
  plan statistics.

6. The method of claim 1, further comprising:
normalizing the plurality of statistics to remove identifying information.

7. The method of claim 6, further comprising:
aggregating a plurality of normalized statistics corresponding to a plurality of queries to generate a plurality of generalized statistics corresponding to the plurality of queries.

8. The method of claim 1, further comprising:
determining whether a size of collected statistics satisfies a threshold size,
wherein receiving the indication to cease collecting the first statistic type is in response to determining that the size of the collected statistics satisfies the threshold size.

9. The method of claim 1, further comprising:
determining whether the duration of collected statistics satisfies a threshold size,
wherein receiving the indication to cease collecting the first statistic type is in response to determining that the duration of the collected statistics satisfies the threshold size.

10. A system comprising:
data processing hardware; and
memory hardware in communication with the data processing hardware, the memory hardware storing instructions that, when executed on the data processing hardware, cause the data processing hardware to:
  receive a schema defining a relational database for storing a plurality of statistics corresponding to a query, the relational database comprising a plurality of data tables relationally connected according to the schema, each data table of the plurality of data tables corresponding to a respective statistic, wherein the plurality of statistics includes a first statistic having a first statistic type and a second statistic having a second statistic type that is distinct from the first statistic type, wherein the first and second statistic types are selected from the group consisting of: instance statistics, session statistics, transaction statistics, query statistics, plan statistics, and wait event statistics;
  obtain the query corresponding to data at a data store;
  execute, using a query executor, the query on the data at the data store; and
  during execution of the query on the data at the data store:
    collect, as the query is executing, from a query execution database, the plurality of statistics indicative of performance characteristics specific to the query as the query executes, each statistic of the plurality of statistics corresponding to a respective data table of the plurality of data tables of the relational database; and
    for each statistic of the plurality of statistics, storing the respective statistic at the respective data table according to the schema;

receive an indication to cease collecting first statistic type; and
    in response to receiving the indication, cease collection of the first statistic associated with the first statistic type while continuing to collect at least the second statistic associated with the second statistic type.

11. The system of claim 10, wherein:
the schema comprises a tree data structure comprising a plurality of nodes;
each data table of the plurality of data tables corresponds to a respective node of the plurality of nodes of the tree data structure; and
the plurality of statistics includes one or more of: session statistics, transaction statistics, query statistics, plan statistics, wait event statistics, buffer usage statistics, or write-ahead logging (WAL) usage statistics.

12. The system of claim 11, wherein, in response to receiving the indication to cease collecting the first statistic type, the instructions, when executed on the data processing hardware, further cause the data processing hardware to:
  identify a particular node of a tree data structure of the schema that corresponds to the first statistic; and
  cease collection of statistics associated with each node in the tree data structure that is descendant from the particular node.

13. The system of claim 10, wherein the instructions, when executed on the data processing hardware, further cause the data processing hardware to:
  access the stored plurality of statistics, by the data processing hardware, from the respective data table according to the schema; and
  execute a second query on the data store, the second query being based at least in part on the accessed plurality of statistics.

14. The system of claim 11, wherein the plurality of statistics include one or more of:
  instance statistics;
  session statistics;
  auxiliary process statistics;
  transaction statistics;
  activity statistics;
  wait event statistics;
  query statistics; or
  plan statistics.

15. The system of claim 10, wherein the instructions, when executed on the data processing hardware, further cause the data processing hardware to:
  normalize the plurality of statistics to remove identifying information.

16. The system of claim 15, wherein the instructions, when executed on the data processing hardware, further cause the data processing hardware to:
  aggregate a plurality of normalized statistics corresponding to a plurality of queries; and
  generate a plurality of generalized statistics corresponding to the plurality of queries.

17. The system of claim 10, wherein the instructions, when executed on the data processing hardware, further cause the data processing hardware to:
  determine whether a size of collected statistics satisfies a threshold size,
  wherein receiving the indication to cease collecting the first statistic type is in response to determining that the size of the collected statistics satisfies the threshold size.

18. The system of claim 10, wherein the instructions, when executed on the data processing hardware, further cause the data processing hardware to:

determine whether the duration of collected statistics satisfies a threshold size, wherein receiving the indication to cease collecting the first statistic type is in response to determining that the duration of the collected statistics satisfies the threshold size.

19. A non-transitory computer-readable medium storing instructions that, when executed by processing circuitry, cause the processing circuitry to:

receive a schema defining a relational database for storing a plurality of statistics corresponding to a query, the relational database comprising a plurality of data tables relationally connected according to the schema, each data table of the plurality of data tables corresponding to a respective statistic, wherein the plurality of statistics includes a first statistic having a first statistic type and a second statistic having a second statistic type that is distinct from the first statistic type, wherein the first and second statistic types are selected from the group consisting of: instance statistics, session statistics, transaction statistics, query statistics, plan statistics, and wait event statistics;

obtain the query corresponding to data at a data store;

execute, using a query executor, the query on the data at the data store;

during execution of the query on the data at the data store:

collect, as the query is executing, from a query execution database, the plurality of statistics indicative of performance characteristics specific to the query as the query executes, each statistic of the plurality of statistics corresponding to a respective data table of the plurality of data tables of the relational database; and for each statistic of the plurality of statistics, storing the respective statistic at the respective data table according to the schema;

receive an indication to cease collecting the first statistic type; and in response to receiving the indication, cease collection of the first statistic associated with the first statistic type while continuing to collect at least the second statistic associated with the second statistic type.

20. The non-transitory computer-readable medium of claim 19, wherein, in response to receiving the indication to cease collecting the first statistic type, the instructions, when executed on the data processing hardware, further cause the data processing hardware to:

identify a particular node of a tree data structure of the schema that corresponds to the first statistic; and cease collection of statistics associated with each node in the tree data structure that is descendant from the particular node.

* * * * *